United States Patent
Nishimura

(10) Patent No.: US 8,235,197 B2
(45) Date of Patent: Aug. 7, 2012

(54) SEAL STRUCTURE

(75) Inventor: Tomoaki Nishimura, Fukushima-Ken (JP)

(73) Assignee: NOK Corporation, Tokyo (JP)

( * ) Notice: Subject to any disclaimer, the term of this patent is extended or adjusted under 35 U.S.C. 154(b) by 323 days.

(21) Appl. No.: 12/699,574

(22) Filed: Feb. 3, 2010

(65) Prior Publication Data
US 2010/0200355 A1  Aug. 12, 2010

(30) Foreign Application Priority Data
Feb. 6, 2009  (JP) ................... 2009-025924

(51) Int. Cl.
F16D 25/0638 (2006.01)
F16D 25/12 (2006.01)

(52) U.S. Cl. ............... 192/85.25; 192/85.41; 192/85.44; 192/106 F

(58) Field of Classification Search ............... 192/85.25, 192/85.44, 106 F
See application file for complete search history.

(56) References Cited

U.S. PATENT DOCUMENTS

| 5,558,195 A * | 9/1996 | Bucciero | 192/85.42 |
| 7,909,140 B2 * | 3/2011 | Sugihara et al. | 184/6.12 |
| 2003/0168306 A1 * | 9/2003 | Gorman et al. | 192/106 F |
| 2008/0245225 A1 * | 10/2008 | Goto | 92/130 R |
| 2010/0025937 A1 * | 2/2010 | Morishita et al. | 277/549 |

FOREIGN PATENT DOCUMENTS

| JP | 2003-278798 A | 10/2003 |
| JP | 2004-204935 A | 7/2004 |
| JP | 2007-198612 A | 8/2007 |
| JP | 2007-303483 A | * 11/2007 |

* cited by examiner

Primary Examiner — Richard M. Lorence
(74) Attorney, Agent, or Firm — David J. Sepanik, Esq.; Harness, Dickey & Pierce, P.L.C.

(57) ABSTRACT

A seal structure provided in an inner mechanism of an automatic shift gear includes: a housing; a piston; a canceller; a return spring; an opponent member which is disposed opposite to a centrifugal canceller chamber in the canceller and forms an oil path between the opponent member and the canceller; an outer circumferential seal unit which is provided on an outer circumferential portion of the canceller and comes into contact with the piston to seal an operating oil supplied to the canceller chamber; and a second outer circumferential seal unit which is provided on the outer circumferential portion of the canceller and comes into contact with the opponent member to seal an operating oil flowing through the oil path, in which the second circumferential seal unit has an axial seal shape which comes into contact with an inner circumferential shape of a cylindrical shape provided on the opponent member.

1 Claim, 3 Drawing Sheets

SEAL STRUCTURE

CROSS-REFERENCE TO RELATED APPLICATIONS

This application claims the benefit and priority of Japanese Application No. 2009-025924, filed Feb. 6, 2009. The entire disclosure of the above application is incorporated herein by reference.

FIELD

The present disclosure relates to a seal structure, and more particularly, to a seal structure provided in an inner mechanism of an automatic shift gear of a vehicle such as a car.

BACKGROUND

This section provides background information related to the present disclosure which is not necessarily prior art.

A hydraulic piston mechanism is provided in an automatic shift gear of a vehicle such as a car in order to switch between connection and disconnection of a clutch to turn on and off the transmission of a torque. The piston mechanism is provided with a canceller for cancelling a centrifugal hydraulic pressure exerted on a piston during rotation.

FIG. 3 illustrates an example of an inner mechanism of an automatic shift gear including this type of piston mechanism. A canceller 52, a piston 53, a return spring 54, and the like are assembled in a housing 51 configured with a rotation drum or the like. A pressure chamber 55 is formed between the housing 51 and the piston 53, and an operating oil is supplied to the pressure chamber 55 such that the piston 53 reciprocally moves to press and connect the clutch 56. A centrifugal canceller chamber 57 is formed between the piston 53 and the canceller 52, and an operating oil is supplied to the centrifugal canceller chamber 57 such that a centrifugal hydraulic pressure exerted on the piston 53 during rotation is cancelled.

In addition, an opponent member 58 configured with a pinion shaft or a carrier of a planetary gear mechanism is disposed opposite to the centrifugal canceller chamber 57 in the canceller 52, and an oil path 59 for supplying an operating oil to nearby components as a lubricating oil is formed between the canceller 52 and the opponent member 58.

An outer circumferential seal unit 60 configured with a lip seal is provided on an outer circumferential portion of the canceller 52 and comes into contact with the piston 53 to seal an operating oil supplied to the centrifugal canceller chamber 57. In addition, a second outer circumferential seal unit 61 configured with a lip seal is provided on the outer circumferential portion of the same canceller 52 and comes into contact with the opponent member 58 to seal an operating oil (lubricating oil) flowing through the oil path 59.

In the piston mechanism having the above-mentioned configuration, since the centrifugal hydraulic pressure exerted on the piston 53 during rotation is cancelled, the piston 53 can be properly operated. In addition, since the operating oil (lubricating oil) is supplied from the oil path 59, the nearby components can be properly operated. However, in the seal structure, since the second outer circumferential seal unit 61 which comes into contact with the opponent member 58 has an end face seal shape in which the lip of the second outer circumferential seal unit 61 comes into contact with an axial end face of the opponent member 58, there are problems as follows.

(1) When an axial movement of the opponent member 58 is large, it is difficult to ensure traceability of the lip.

(2) Although the second outer circumferential seal unit 61 needs pressure resistance due to the centrifugal hydraulic pressure exerted thereto, since margins have to be set to be great and pressure resistance has to be ensured, a cross-section of the lip has to be great. Therefore, stiffness of the lip increases, and a reaction force increases, so that operability thereof may be degraded.

(3) Due to the centrifugal hydraulic pressure, there is a possibility that turn-up of the lip may occur. [Patent Document 1] Japanese Patent Application Laid-Open No. 2003-278798 (FIG. 3).

SUMMARY

This section provides a general summary of the disclosure, and is not a comprehensive disclosure of its full scope or all of its features.

In order to solve the above-mentioned problem, the disclosure provides a seal structure which can improve traceability of a second outer circumferential seal unit provided on an outer circumferential portion of a canceller to seal an operating oil flowing through an oil path between the canceller and an opponent member with respect to the opponent member and improve the sealing performance.

According to an aspect of the disclosure, a seal structure provided in an inner mechanism of an automatic shift gear includes: a housing; a piston; a canceller; a return spring; an opponent member which is disposed opposite to a centrifugal canceller chamber in the canceller and forms an oil path between the opponent member and the canceller; a first outer circumferential seal unit is provided on an outer circumferential portion of the canceller and comes into contact with the piston to seal an operating oil which is supplied to the centrifugal canceller chamber; and a second outer circumferential seal unit is provided on the outer circumferential portion of the canceller and comes into contact with the opponent member to seal an operating oil flowing through the oil path, in which the second circumferential seal unit has an axial seal shape which comes into contact with an inner circumferential shape of a cylindrical shape provided on the opponent member.

In the prior art, with regard to the "end face seal shape", when the opponent member moves in the axial direction as the outer circumferential seal unit comes into contact with an axial end face of the opponent member, the contact state of the outer circumferential seal unit with respect to the opponent member immediately changes. On the other hand, according to the present disclosure, the second outer circumferential seal unit has an "axial seal shape" which comes into contact with an inner circumferential shape of a cylindrical shape provided on the opponent member, so that the contact state of the second outer circumferential seal unit with respect to the opponent member does not change although the opponent member moves in the axial direction. Therefore, it is possible to improve traceability of the second outer circumferential seal unit with respect to the opponent member. As the inner circumferential surface of the cylindrical shape provided on the opponent member, for example, an inner circumferential surface of a rising part of a cylindrical shape provided on the opponent member is used.

The design of the present disclosure has the following advantages. That is, in the seal structure of the present disclosure, as described above, the second outer circumferential seal unit which is provided on the outer circumferential portion of the canceller to seal the operating oil flowing through the oil path between the canceller and the opponent member has an axial seal shape which comes into contact with the inner circumferential surface of the cylindrical shape provided on the opponent member, so that the contact state of the second outer circumferential seal unit with respect to the opponent member does not change even though the opponent member moves in the axial direction. Therefore, it is possible to improve traceability of the second outer circumferential seal unit with respect to the opponent member, and accordingly, it is possible to improve sealing performance. In addition, it is possible to suppress a seal reaction force, thereby preventing a turn-up phenomenon.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The disclosure includes the following embodiments. (1) In a canceller used for an inside of an automatic shift gear of a vehicle to cancel a piston centrifugal hydraulic pressure, in order to allow an end face portion to have a sealing function to lubricate an opponent member (to prevent the opponent member from being seized), an existing mechanism was provided with an end face lip. However, when an axial movement of the opponent member is great, there is a problem in that it is difficult to ensure traceability of the end face lip. In addition, the centrifugal hydraulic pressure is loaded on the end face lip and thus the end face lip needs pressure resistance. However, since margins have to be set to be great and pressure resistance has to be ensured, a cross-section of the lip has to be great. Therefore, there was a problem in that stiffness of the lip increases and a reaction force increases (operability degrades). Furthermore, there is a possibility that turn-up of the lip occurs due to the centrifugal hydraulic pressure.

(2) In order to solve the problems, the existing end face seal shape is changed to an axial seal shape to achieve an improvement in traceability of the lip with respect to the opponent member.

(3) In the configuration, the end face seal is changed into the axial seal, so that it is possible to improve traceability of the seal with respect to the opponent member, thereby enhancing sealing performance.

Figure 1:
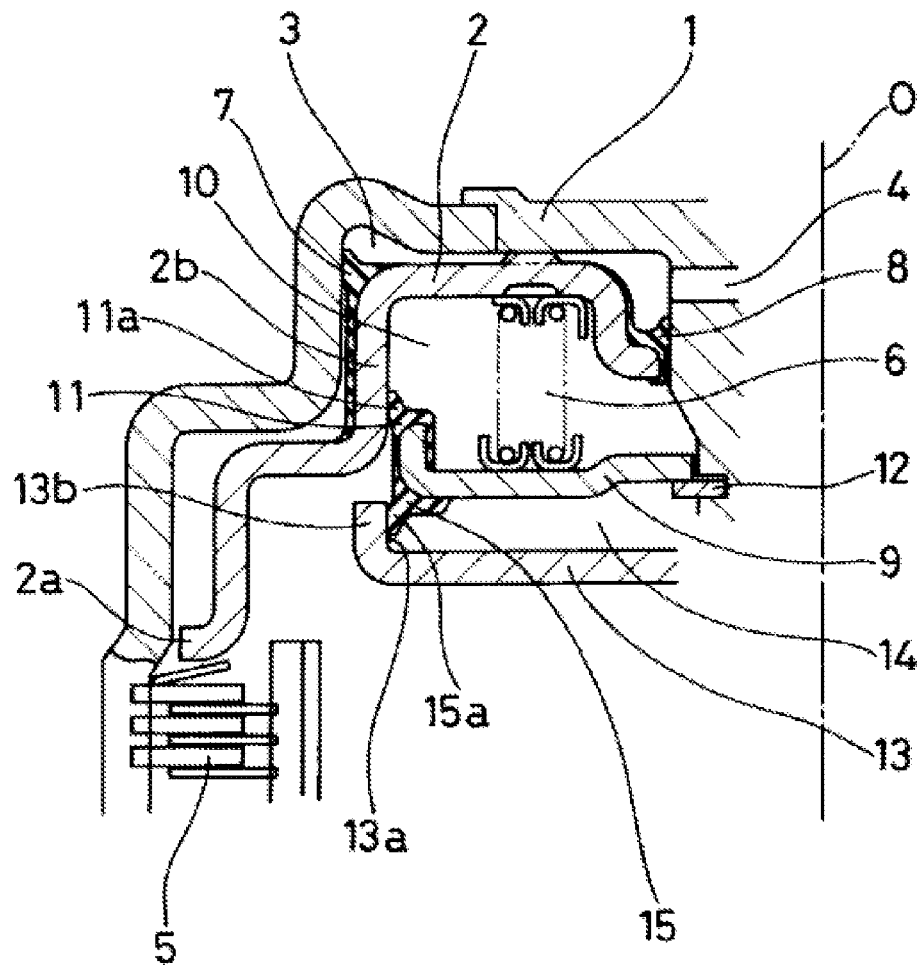
FIG. 1 is a cross-sectional view of a main part of a piston mechanism having a seal structure according to an example of the present disclosure.

Next, an example of the present disclosure will be described with reference to the drawings. FIG. 1 illustrates a cross-section of a main part of a piston mechanism having a seal structure according to an example of the present disclosure. The piston mechanism is provided inside an automatic shift gear of a vehicle such as a car and is hydraulically operated to switch between connection and disconnection of a clutch so as to turn on and off the transmission of a torque. The piston mechanism has a configuration as follows.

First, a housing 1 configured with a rotation drum, a drum shaft, and the like which rotate about a central axis O, and an annular piston 2 is disposed to reciprocally move in an axial direction in the housing 1. The piston 2 forms an annular pressure chamber 3 between the piston 2 and the housing 1. When an operating oil is supplied from a supply port 4 to the pressure chamber 3, the piston 2 moves downward in the figure and presses the multi-disc clutch 5 with a pressing unit 2a provided on an outer circumferential lower portion thereto to turn on the connection of the clutch 5. When the operating oil is discharged from the pressure chamber 3, the piston 2 is returned by elasticity of a return spring 6 upwards in the figure. In order to seal the pressure chamber 3, the piston 2 is provided with an outer circumferential seal 7 and an inner circumferential seal 8 each of which is made of a rubber-like elastic lip seal.

Since the housing 1 and the piston 2 rotate at high speed, the operating oil supplied to the pressure chamber 3 is directed on the outer circumferential side by a centrifugal force. Therefore, a centrifugal hydraulic pressure occurs in the pressure chamber 3, and the centrifugal hydraulic pressure is exerted to interrupt the returning operation of the piston 2 due to the return spring 6. Therefore, in order to cancel the centrifugal force, an annular canceller (called a canceller plate or a cancel plate) 9 is disposed on a lower side of the piston 2 in the figure, and an annular centrifugal canceller chamber 10 is formed between the piston 2 and the canceller 9. Since an operating oil is supplied from the supply port (not shown) to the centrifugal canceller chamber 10, a centrifugal hydraulic pressure occurs here. Therefore, by balancing the centrifugal hydraulic pressure that occurs in the centrifugal canceller chamber 10 with the centrifugal hydraulic pressure that occurs in the pressure chamber 3, the centrifugal hydraulic pressure is cancelled.

In order to seal the centrifugal canceller chamber 10, an outer circumferential seal unit 11 (first outer circumferential seal unit) configured with a rubber-like elastic lip seal is provided on an outer circumferential portion of the canceller 9, and the outer circumferential seal unit 11 has a structure in which a lip 11a slidably comes into contact with an inner circumferential surface of a cylindrical portion 2b of the piston 2. In addition, the canceller 9 is fixed to the housing 1 by a snap ring 12 with an inner circumferential portion of the canceller 9. Depending on a specification of a product, there may be a case where an inner circumferential seal unit which comes into contact with the housing 1 is provided on the inner circumferential portion of the canceller 9. However, according to this example, such an inner circumferential seal unit is not provided (the inner circumferential seal unit may be provided or may not be provided).

An opponent member 13 configured with a pinion shaft or a carrier of the planetary gear mechanism is disposed on a lower side of the canceller 9 in the figure, an oil path 14 for supplying a lubricating oil to nearby components is formed between the canceller 9 and the opponent member 13, and a second outer circumferential seal unit 15 configured with a rubber-like elastic lip seal is provided on an outer circumferential portion of the canceller 9 so as not to allow the operating oil flowing through the oil path 14 to leak from the oil path 14 (in other words, so as to define a route of the oil path 14).

Figure 2:
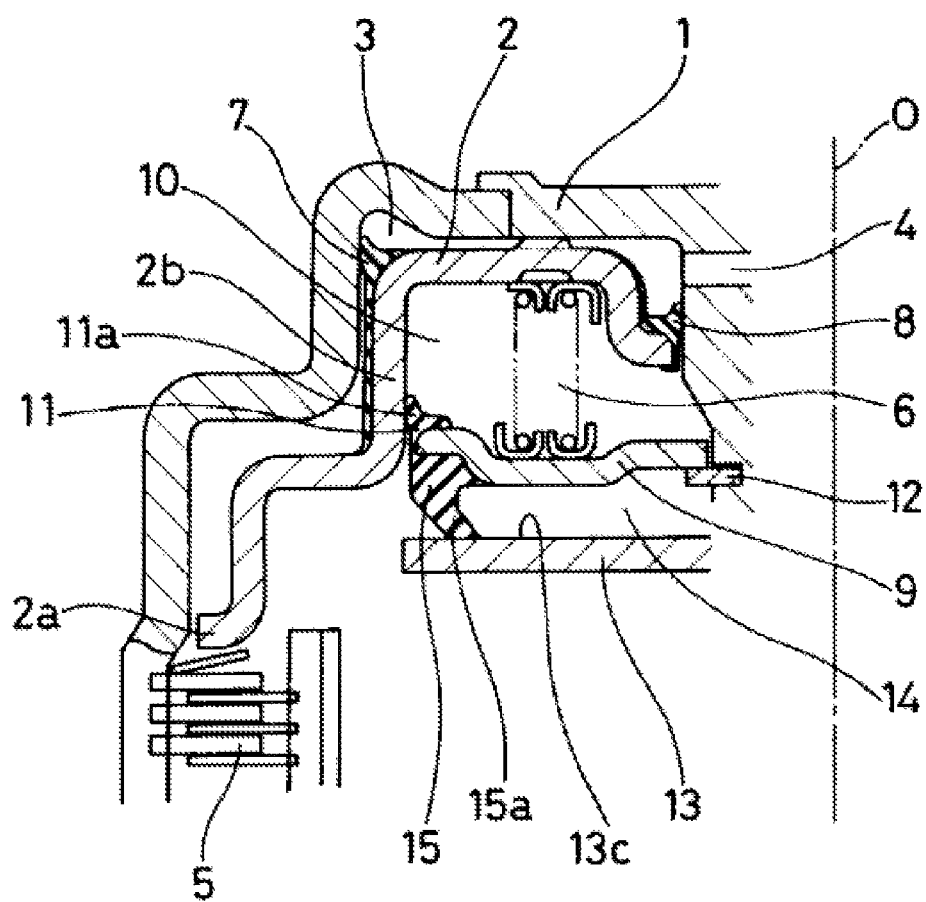
FIG. 2 is a cross-sectional view of a main part of a piston mechanism having a seal structure according to a comparative example of the present disclosure.
Figure 3:
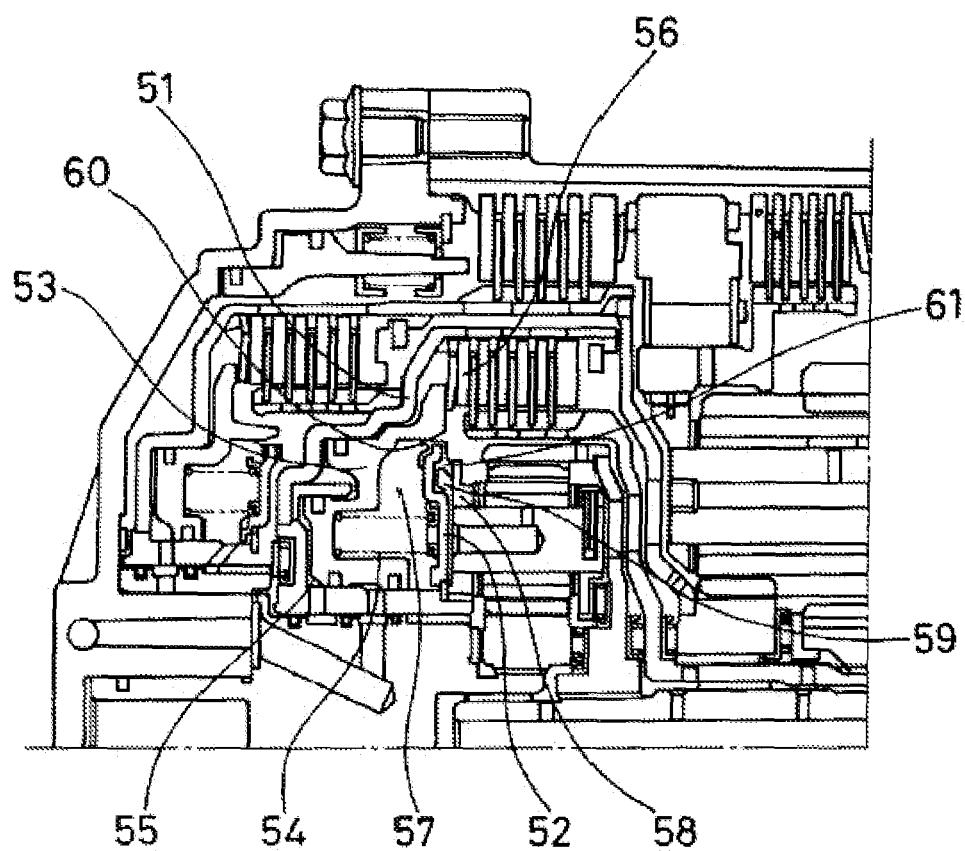
FIG. 3 is an explanatory view of an inner mechanism of an automatic shift gear having a seal structure according to an existing example.

Here, for a comparative example, as illustrated in FIG. 2, when the second outer circumferential seal unit 15 has an end face seal shape so that a lip 15a comes into contact with an axial end face 13c of the opponent member 13, there is a problem in that it is difficult to ensure traceability of the second outer circumferential seal unit 15 with respect to the opponent member 13 as described above.

Therefore, according to this example, as illustrated in FIG. 1, the second outer circumferential seal unit 15 has an axial seal shape so that the lip 15a comes into contact with an inner circumferential surface 13a of a cylindrical shape provided on the opponent member 13, thereby achieving an improvement in the traceability. The opponent member 13 is provided with a cylindrical rising part (cylindrical part) 13b, and an inner circumferential surface of the rising part 13b is configured as the inner circumferential surface 13a of the cylindrical shape.

In the configuration described above, since the second outer circumferential seal unit 15 provided on the outer circumferential portion of the canceller 9 to seal the operating oil flowing through the oil path 14 between the canceller 9 and the opponent member 13 has the axial seal shape which comes into contact with the inner circumferential surface 13a of the cylindrical shape provided on the opponent member 13, the contact state of the second outer circumferential seal unit 15 to the opponent member 13 is not changed even though the opponent member 13 moves in the axial direction. Therefore, it is possible to improve traceability of the second outer circumferential seal unit 15 with respect to the opponent member 13, so that it is possible to enhance sealing performance. Furthermore, the shape suppresses a seal reaction force (lip reaction force) and thus can prevent turn-up of the lip 15a.

In addition, according this example, the outer circumferential seal unit 11 provided on the canceller 9 and the second outer circumferential seal unit 15 are formed integrally with each other so as to be continuous. However, they may be separated from each other.

In addition, according to this example, a specific example of the opponent member 13 is the pinion shaft or the carrier of the planetary gear mechanism. However, the example is not limited thereto as long as the outer circumferential seal unit 11 comes into contact with the second outer circumferential seal unit 15 provided on the canceller 9. The operating oil to be sealed may not be used for the purpose of lubricating.

[Description of Symbols]
1: HOUSING
2: PISTON
2a: PRESSING UNIT
2b: CYLINDRICAL PORTION
3: PRESSURE CHAMBER
4: SUPPLY PORT
5: CLUTCH
6: RETURN SPRING
7: OUTER CIRCUMFERENTIAL SEAL
8: INNER CIRCUMFERENTIAL SEAL
9: CANCELLER
10: CENTRIFUGAL CANCELLER CHAMBER
11: OUTER CIRCUMFERENTIAL SEAL UNIT
11a, 15a: LIP
12: SNAP RING
13: OPPONENT MEMBER
13a: INNER CIRCUMFERENTIAL SURFACE OF CYLINDRICAL SHAPE
13b: RISING PART
14: OIL PATH
15: SECOND OUTER CIRCUMFERENTIAL SEAL UNIT
O: CENTRAL AXIS The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A seal structure provided in an inner mechanism of an automatic shift gear comprising:
    a piston which is disposed in a housing to reciprocally move, forms a pressure chamber between the piston and the housing, and moves to press a clutch by supplying an operating oil to the pressure chamber;
    a canceller which is disposed opposite to the pressure chamber in the piston and forms a centrifugal canceller chamber between the canceller and the piston;
    a return spring which is disposed between the piston and the canceller and returns the piston;
    an opponent member which is disposed opposite to the centrifugal canceller chamber in the canceller and forms an oil path between the opponent member and the canceller;
    an outer circumferential seal unit which is provided on an outer circumferential portion of the canceller and comes into contact with the piston to seal an operating oil which is supplied to the centrifugal canceller chamber; and
    a second outer circumferential seal unit which is provided on the outer circumferential portion of the same canceller and comes into contact with the opponent member to seal an operating oil flowing through the oil path,
    wherein the second outer circumferential seal unit has an axial seal shape which comes into contact with an inner circumferential surface of a cylindrical shape provided on the opponent member.

* * * * *